(12) United States Patent
Kotchi et al.

(10) Patent No.: US 6,354,267 B1
(45) Date of Patent: Mar. 12, 2002

(54) INJECTION MOLDED THROTTLE BODY

(75) Inventors: Gary W. Kotchi, Shelby Township;
Michael J. Halsig, Warren, both of MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/536,554

(22) Filed: Mar. 28, 2000

(51) Int. Cl.⁷ .................................................. F02D 9/10
(52) U.S. Cl. ........................ 123/337; 251/305; 251/308
(58) Field of Search .......................... 123/337; 251/305, 251/308

(56) References Cited

U.S. PATENT DOCUMENTS

| | | | | |
|---|---|---|---|---|
| 5,617,825 A | * | 4/1997 | Altmann et al. | 123/337 |
| 5,669,350 A | * | 9/1997 | Altmann et al. | 123/337 |
| 5,791,312 A | * | 8/1998 | Sattler et al. | 123/337 |
| 5,881,555 A | * | 3/1999 | Jaeger | 60/310 |
| 5,979,871 A | * | 11/1999 | Forbes et al. | 251/305 |
| 5,988,131 A | | 11/1999 | Hernandez et al. | |
| 6,082,976 A | * | 7/2000 | Kempf et al. | 417/423.1 |

FOREIGN PATENT DOCUMENTS

EP       0947681 A2     10/1999

OTHER PUBLICATIONS

GE Plastics, "Product Data Sheet", dated Mar. 23, 1998, 2 pages.
AMODEL PPA Engineering Data, Table 7, "Typical Properties of Glass Reinforced AMODEL Resins<SI Units", P. 12.
AMODEL PPA Engineering Data, Table 8, "Typical Properties of Glass Reinforced AMODEL Resins—U.S. Customary Units", p. 13.

* cited by examiner

Primary Examiner—Erick Solis
(74) Attorney, Agent, or Firm—Warn, Burgess & Hoffman, P.C.; Greg Dziegielewski

(57) ABSTRACT

An injection molded throttle body having a one-piece lever shaft and plate which is installed as a single piece unit in a laterally split throttle body housing.

28 Claims, 3 Drawing Sheets

US 6,354,267 B1

INJECTION MOLDED THROTTLE BODY

BACKGROUND OF THE INVENTION

The present application relates to throttle bodies for intake manifolds of a spark ignition internal combustion engine. More specifically, the present invention relates to an intake manifold for a spark ignition internal combustion engine that has an integrally molded plate, shaft and lever assembly.

In the past, there has been a need for easy to assemble, lightweight and more reasonably priced components for fuel injected engines which require a throttle body. In the past, throttle bodies have typically been configured as a one-piece housing in which a plate, shaft and lever assembly were assembled in separate pieces of a housing. Typically, because of the one-piece construction of the housing, a somewhat time consuming assembly process was necessary in order to pivotally secure the plate member inside of the throttle body bore and thereafter connect the peripheral portions and/or control inputs along the shaft.

Thus, in typical prior art constructions, a multi-step process was required for pressing bearings and then installing the shaft, springs, and lever assembly and the like. Typically with such constructions, the throttle control spring was inboard of the throttle lever assembly. Additionally, the throttle lever assembly, shaft and plate were all separate pieces which needed to be connected by way of rivets or the like in order to provide a finished throttle body for installation on an engine. As might be readily appreciated, most of these parts have been made from metal, which is heavy, and the steps necessary to assemble the throttle body made such units relatively expensive components of the vehicle engine.

In recent years, there have been some advances in throttle body designs, such as providing a two-piece assembly. A two-piece throttle body makes it easier to install the plate member. However, there remains a need for making a cheaper, inexpensive, reliable throttle body housing.

SUMMARY OF THE INVENTION

In accordance with the present invention, there is provided a throttle body assembly for an engine, which includes a throttle body housing having a central intake bore therethrough. In the present invention, a throttle plate member is rotatably disposed in said bore for metering air flow through the throttle body and to the engine. The throttle plate member of the present invention includes a shaft member, which is effective for pivoting the plate member about an axis. In the present invention, the throttle plate member and the shaft and lever assembly and the like are integrally formed by one-piece injection molding and installed in the throttle body as a single piece.

Further understanding of the present invention will be had by reference to the detailed description of the preferred embodiments set forth below when taken in conjunction with the examples and claims appended hereto.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
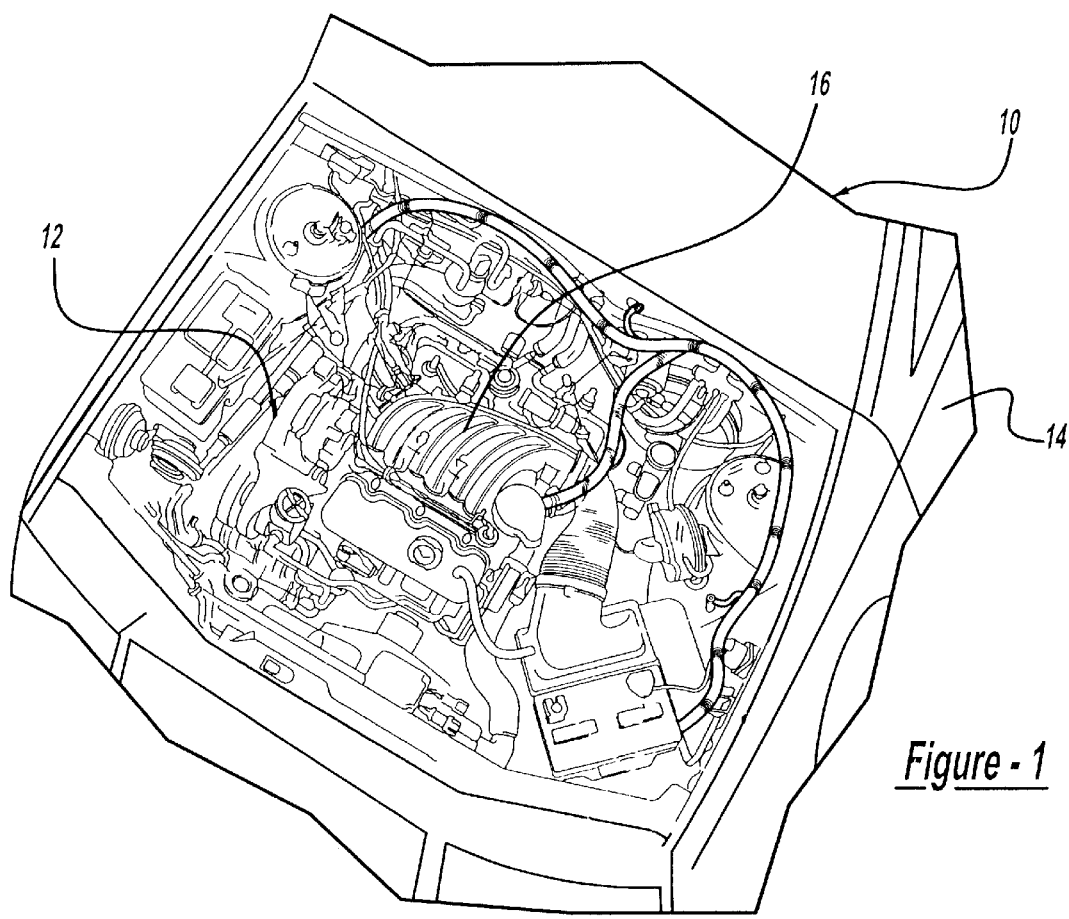
FIG. 1 is a perspective view of an engine utilizing a throttle body in accordance with the present invention.
Figure 2:
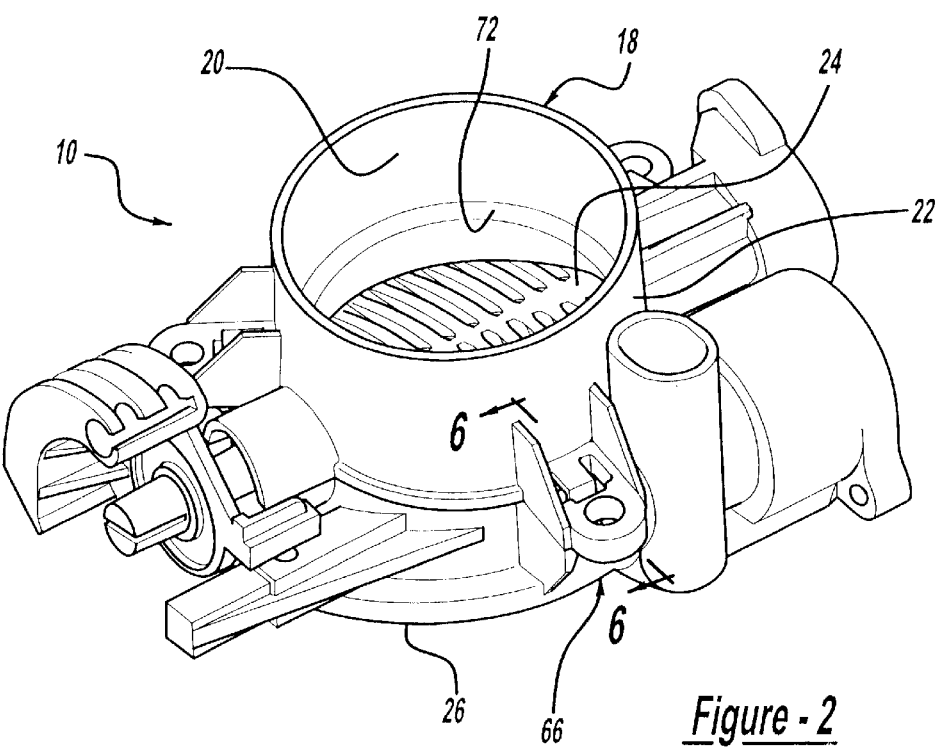
FIG. 2 is a detailed perspective view of a throttle body in accordance with the present invention.

In accordance with the present invention, there is provided a throttle body generally shown at 10 for use on an engine 12 of a vehicle 14. Particular throttle bodies are typically used for attachment to an intake manifold 16 of a fuel injected engine. The throttle body of the present invention is unique in that it is entirely produced from injection molded portions. The throttle body of the present invention includes a throttle body housing generally indicated at 18. The throttle body 18 includes a central intake bore 20 therethrough. The throttle body of the present application includes an upper throttle body member 22, a throttle plate, shaft, and lever assembly member 24, and a lower throttle body member 26. The throttle plate, shaft, and lever assembly member 24 is rotatably disposed in the bore 20 for metering of air flow through the throttle body, and thus controlling engine speed.

Figure 4:
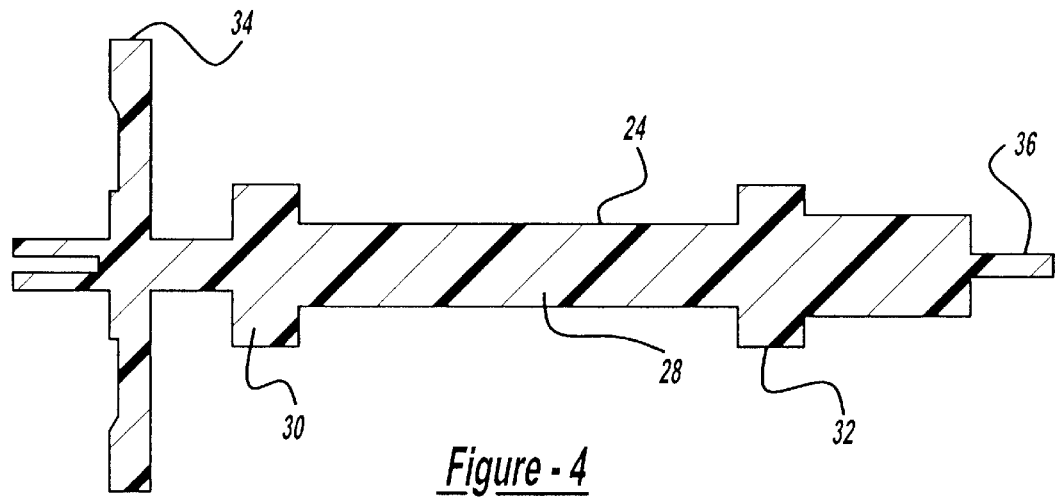
FIG. 4 is a section taken along line 4—4 of FIG. 3.
Figure 5:
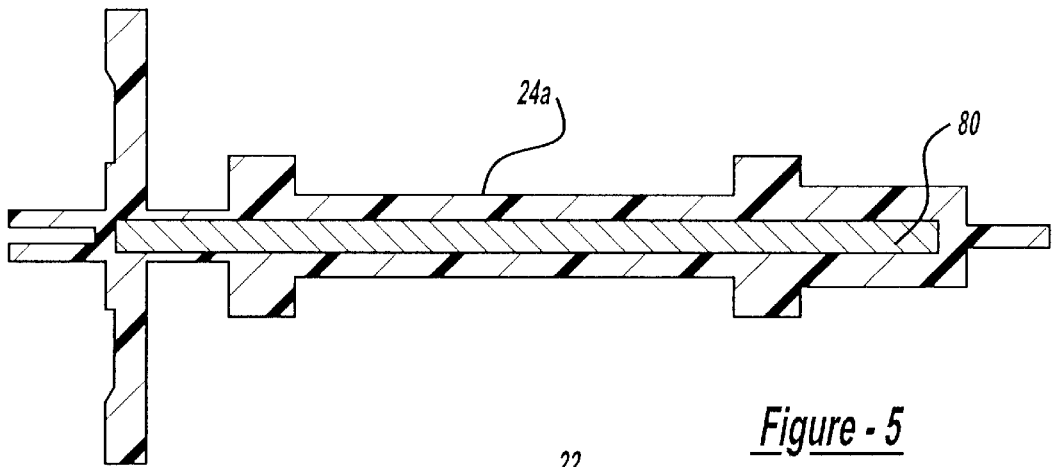
FIG. 5 is a section of an alternate embodiment of the plate, shaft and lever assembly of FIG. 3.

The throttle plate, shaft, and lever assembly member 24 of the present invention is different from prior art devices in that it is a one-piece integrally molded assembly, such as shown in FIGS. 4 and 5. In prior throttle body designs, it is required to assemble the throttle plate assembly and shaft in the throttle body after casting of the throttle body. This is labor intensive and the metal used in the castings adds undesirable weight to the vehicle.

Figure 3:
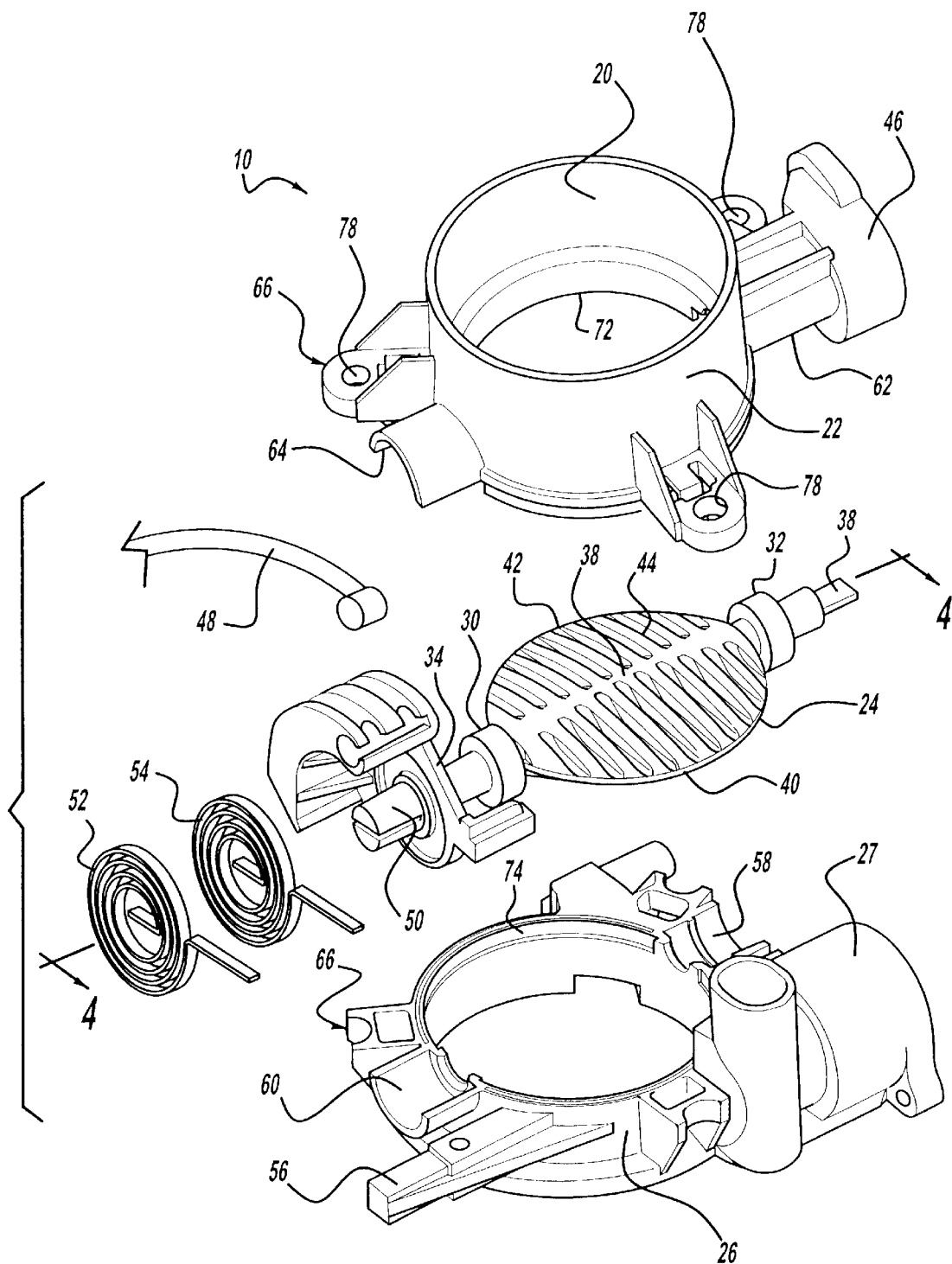
FIG. 3 is an exploded perspective view of the throttle body of the present invention.

The throttle plate, shaft, and lever assembly member 24 shown in FIG. 3 includes a central plate portion 28 (as shown in FIG. 4), bearing members 30 and 32, a throttle cable connection portion 34, and a position sensor end 36. The plate member is thick in the center portion 38 and tapers outward to edge portions 40 and 42. A series of strengthening ribs 44 is provided on the upper and lower surfaces of the plate member. The profile of these ribs also provides improved air flow over the plate surfaces, for increasing engine performance. However, other strengthening ribs or the like may be included for strengthening of the throttle plate.

The throttle position sensor end engages the throttle position sensor 46 for sensing the position of the throttle plate, shaft, and lever assembly member 24. The cable end 34 (or lever) connects to a cable 48 for throttle control of the throttle plate, shaft, and lever assembly member 24. The cable end 34 includes a spring retaining shaft. The throttle return springs 52 and 54 engage the shaft 50 and are positioned by the spring positioning arm 56. Cable end is outboard of the bearings, which provides an efficient assembly of the cable to the plate assembly. This also allows for the throttle return spring to be installed on the outside of the assembly, further streamlining the assembly process.

Lower throttle body member 26 also includes an air idle bypass chamber 27, which is connected to an air source in the clean side of the air filter. Idle bypasses are known and typically are operably connected to a control valve which controls a linear solenoid or stepper motor for positioning of the bypass control valve at idle. The present invention differs from prior art designs in that the reference air source is taken from the clean side of the air cleaner rather than directly from the throttle body inlet.

Figure 6:
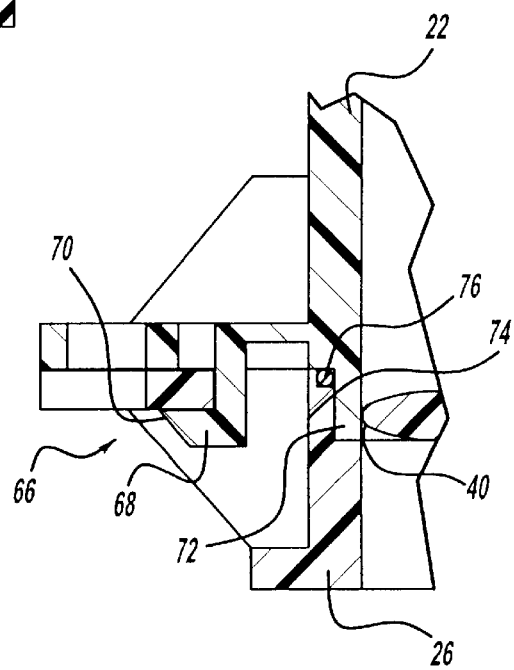
FIG. 6 is a detailed broken away perspective view of a connection assembly for the throttle body taken along line 6—6 of FIG. 3.

Upon assembly, the bearings 30 and 32 rest in bearing surfaces 58 and 60 in the lower throttle body member and mating bearing surfaces 62 and 64 in the upper throttle body member. The throttle plate, shaft, and lever assembly member 24 is positioned between the upper and lower body members, and they are brought together and temporarily secured in place via clip or snap fit tab assemblies 66, which are shown in more detail in FIG. 6. Bearing members are preferably integrally molded with the plate assembly. Alternatively, ball bearings may be used in their place. For instance, a sealed ball bearing unit could be overmolded into the throttle plate, shaft, and lever assembly member 24.

Each clip assembly 66 includes a spring arm 68, which engages a ledge 70 during engagement of the two halves of the throttle body. This provides for assembly during shipping of the assembled throttle body. Bolt holes 78 are provided for final attachment of the throttle body into the intake manifold. The upper throttle body member 22 includes a concentric lip 72, which fits in a portion 74 of lower throttle body member 26. A seal 76 is provided around the perimeter other than at the bearing areas for sealing the throttle body opening.

Upper throttle body member is preferably produced from an injection moldable material which will allow strict tolerances to be maintained at the position where the edges 40 and 42 are located during the idle position (i.e., where the throttle plate, shaft, and lever assembly member 24 is substantially horizontal). In order to better assure this, the edges 40 and 42 are positioned adjacent the lip 72. Lip 72 is, in fact, designed with a reduced thickness at this location to ensure roundness and proper tolerances between the lip 72 and throttle plate edges 40 and 42 during molding. Materials used for the upper throttle body are preferably engineering resins such as glass reinforced polyether amide resins. A preferred resin is a 30% glass reinforced resin sold under the name ULTEM 2310, available from GE Plastics of Pittsfield, Mass.

Typically, the throttle plate, shaft, and lever assembly member 24 may also be injection molded from an engineering resin such as a polythalamide, or preferably glass-filled polythalamide. A preferred resin is an AMODEL glass reinforced resin, such as A-1145 HS, available from B. P. Amoco Chemicals, having offices in Livonia, Mich. As shown in FIG. 5, the material can be overmolded around a steel support shaft 80 as an alternate embodiment for providing added rigidity and strength if necessary.

Lower throttle body member can be produced from any number of materials. Preferably, a strong inexpensive material such as nylon or the like can be used. Certainly, engineering resins would equally be useful for this component. In an alternate embodiment, the lower throttle body member could also be manufactured as a part of the manifold. In this embodiment, the throttle plate, shaft, and lever assembly member 24 and upper throttle body and other components would be installed in place on the manifold, having the lower throttle body member as an integral part.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A throttle body for use on an engine comprising:
   an injection molded throttle body housing including a central intake bore therethrough, said throttle body including a two-piece assembly including an air discharge portion and an air intake portion;
   a throttle plate member pivotally disposed in said bore for metering airflow through said throttle body, said throttle plate member including a shaft member effective for rotating said plate member where said throttle plate member and said shaft are an integrally formed one piece injection molded assembly and installed in said throttle body as a single piece, and
   a portion of one of said air discharge portion or said air intake portion for forming a close tolerance bore for sealing about an outer periphery of said throttle plate without throttle plate binding.

2. The throttle body of claim 1 wherein the throttle body housing is at least a two-piece assembly connecting at about the shaft portion.

3. The throttle body of claim 1 wherein said portion is formed in said air discharge manifold side of said throttle body.

4. The throttle body of claim 1 wherein said portion is a thin walled lip portion which extends beyond a mid-point of said shaft portion, providing a close tolerance fit about a periphery of said plate member.

5. The throttle body of claim 3 wherein said portion is a thin walled lip portion which extends beyond a mid-point of said shaft portion, providing a close tolerance fit about a periphery of said plate member.

6. The throttle body of claim 5 wherein said plate sealing portion is made from an injection moldable engineering resins capable of maintaining the proper form during injection molding.

7. The throttle body of claim 6 wherein said engineering resin is selected from the group consisting of polythalamide, glass filled polythalamide, polyether amide, glass reinforced polyether amide, and mixtures thereof.

8. The throttle body of claim 1 wherein said plate member comprises an integrally formed injection molded plate, shaft, and lever assembly.

9. The throttle body of claim 8 wherein a throttle return spring is attached outboard of said lever portion.

10. The throttle body of claim 3 wherein the air discharge portion and air intake portion include integral snap fit attachments for pre-assembly of the throttle body prior to final assembly on a vehicle.

11. The throttle body of claim 8 wherein said plate includes a metal shaft strengthening member integrally molded therein.

12. A throttle body for use on an engine comprising:
   a two-piece throttle body and a throttle plate member;
   said two-piece throttle body for defining a central bore having an axis, said two-piece throttle body including an air intake portion and an air discharge portion, said air intake portion and said air discharge portion are joined as an integral unit about a plane perpendicular to the axis of the central bore, said intake portion and said air discharge portion defining a bore along said plane for pivotally securing said throttle plate member in said throttle body, a portion of one of said air discharge or said air intake defines a close tolerance fit about a periphery of said throttle plate member;
   said throttle plate member including a shaft member and a throttle plate integrally molded to form a one-piece injection molded unitary part, which is assembled as a unitary part into said throttle body.

13. The throttle body of claim 12 wherein said portion is formed in said intake manifold side of said throttle body.

14. The throttle body of claim 13 wherein said portion is a thin walled lip portion which extends beyond a mid-point of said shaft portion.

15. The throttle body of claim 14 wherein said air intake portion is made from an injection moldable engineering resins capable of maintaining the proper form during injection molding.

16. The throttle body of claim 15 wherein said engineering resin is selected from the group consisting of polythalamide, glass filled polythalamide, polyether amide, glass reinforced polyether amide, and mixtures thereof.

17. The throttle body of claim 12 wherein said plate member comprises an integrally formed injection molded plate shaft and lever assembly.

18. The throttle body of claim 17 wherein a throttle return spring is attached outboard of said lever portion.

19. The throttle body of claim 12 wherein the air discharge portion and air intake portion include integral snap fit attachments for pre-assembly of the throttle body prior to final assembly on a vehicle.

20. The throttle body of claim 17 wherein said plate includes a metal shaft strengthening member integrally molded therein.

21. A throttle body for use on an engine comprising:

a two-piece throttle body and a throttle plate member, said throttle plate member including an outer peripheral edge;

said two-piece throttle body for defining a central bore having an axis, said two-piece throttle body including an air intake portion and an air discharge portion, said air intake portion and said air discharge portion are joined as an integral unit about a plane perpendicular to the axis of the central bore, said intake portion and said air discharge portion defining a bore along said plane for pivotally securing said throttle plate member in said throttle body, wherein one of said air discharge portion or air intake portions defines a thin walled lip portion which extends beyond a midpoint of said shaft portion and forms a close tolerance fit about the outer periphery of said throttle plate;

said throttle plate member including a shaft member and a throttle plate integrally molded to form a one-piece injection molded unitary part, which is assembled as a unitary part into said throttle body.

22. The throttle body of claim 21 wherein said portion is formed in said intake manifold side of said throttle body.

23. The throttle body of claim 22 wherein said air intake portion is made from an injection moldable engineering resin capable of maintaining the proper form during injection molding.

24. The throttle body of claim 23 wherein said engineering resin is selected from the group consisting of polythalamide, glass filled polythalamide, polyether amide, glass reinforced polyether amide, and mixtures thereof.

25. The throttle body of claim 21 wherein said plate member comprises an integrally formed injection molded plate shaft and lever assembly.

26. The throttle body of claim 25 wherein a throttle return spring is attached outboard of said lever portion.

27. The throttle body of claim 21 wherein the air discharge portion and air intake portion include integral snap fit attachments for pre-assembly of the throttle body prior to final assembly on a vehicle.

28. The throttle body of claim 25 wherein said plate includes a metal shaft strengthening member integrally molded therein.

\* \* \* \* \*